No. 804,107. PATENTED NOV. 7, 1905.
B. EGER.
ATTACHMENT FOR COOKING STOVES.
APPLICATION FILED APR. 18, 1904.
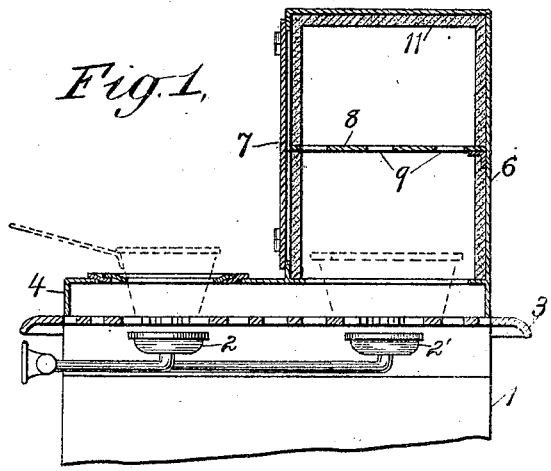
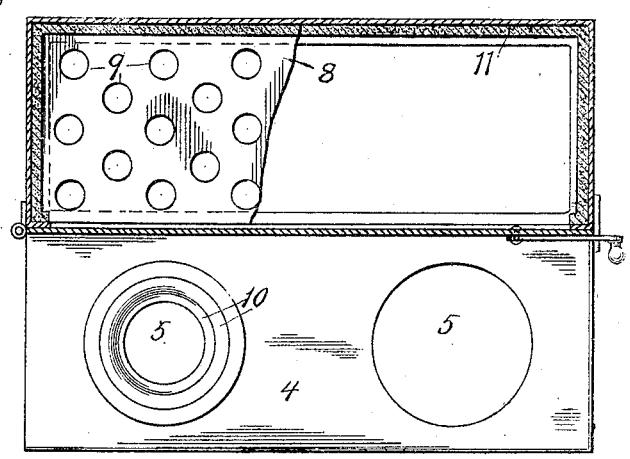
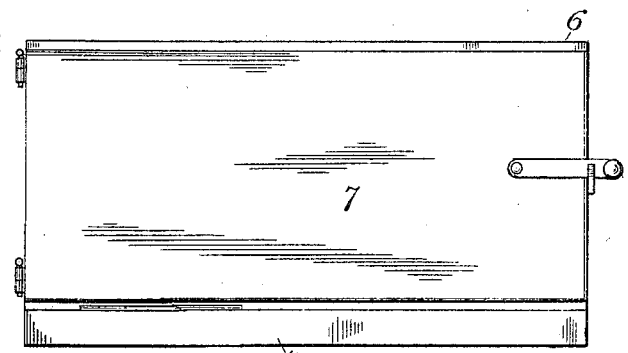
WITNESSES:
Harry Goss.
Charles S. Jones.
INVENTOR
Bertha Eger
BY
ATTORNEY

UNITED STATES PATENT OFFICE.

BERTHA EGER, OF NEW YORK, N. Y.

ATTACHMENT FOR COOKING-STOVES.

No. 804,107.     Specification of Letters Patent.     Patented Nov. 7, 1905.

Application filed April 18, 1904. Serial No. 203,567.

*To all whom it may concern:*

Be it known that I, BERTHA EGER, a citizen of the United States, and a resident of the city of New York, State of New York, have invented certain new and useful Improvements in Attachments for Cooking-Stoves, of which the following is a specification.

My invention relates to an attachment for cooking-stoves, and has for its object the production of an economical, simple, and effective means for conserving the heat of one or more burners of a gas or oil stove for the purpose of keeping prepared or cooked dishes warm.

One objection to the gas or oil stove is that no provision is made for keeping warm the contents of a dish or utensil after being cooked. Delay in serving a meal results in the cooked articles becoming cold and unpalatable, and thus a source of annoyance to those using a gas or oil stove for cooking purposes.

My invention overcomes such objections and will be understood by reference to the accompanying drawings, in which—

Figure 1 is a transverse vertical sectional view; Fig. 2, a top view, partly broken away to show the interior; and Fig. 3, a front view.

Similar reference-numerals indicate similar parts in the several views.

Referring to the drawings, the numeral 1 designates the body portion of a stove having burners 2 and 2' of any suitable type adapted to burn gas or oil and arranged beneath the top 3, upon which the cooking utensils are adapted to be supported. In applying my invention I make the same in the form of a sheet-iron hood adapted to rest upon the top 3, so as to extend over the burners, the front part of said hood having openings 5 therein to permit the placing of cooking utensils over the front burners 2. The rear portion 6 of the hood is provided with a door 7, by which access may be had to the interior to place utensils over the rear burners 2' for the purpose of cooking or keeping warm the contents of said utensil. The rear portion 6 is also provided with one or more shelves 8, dividing said portion into compartments, said shelves having perforations 9 therein to allow the heated products of combustion to circulate about the several compartments of the hood for the purpose of keeping warm the contents of dishes or utensils placed therein.

Rings 10 are provided for the openings 5, so that said openings may be made of various sizes to accommodate different cooking utensils and for the purpose of closing the opening about the utensil to prevent the escape of products of combustion and to cause said products to pass into and circulate about the compartments in the rear portion 6 of the hood.

From the above description it will be seen that I provide a simple and effective attachment which adds materially to the utility of a gas or oil stove, in that cooked or prepared contents of dishes may be kept warm by placing them in the compartments of the portion 6. For such purpose a small flame may be maintained in one of the burners 2, the openings 5 in such case being closed by a cover or lid, or, if one or more of the burners 2 is being used for cooking purposes, the waste products of combustion will pass into and be utilized for heating the rear compartments. In such manner with little or no expense prepared dishes may be kept warm, and thus a source of annoyance to those using gas or oil stoves removed.

My invention may be applied to any form of gas or oil stove and may be sold as a regular attachment or made separate so as to be adapted to any stove now in use.

If desired, the hood may be provided with an asbestos or other covering of non-conductive material to still further increase its efficiency.

What I claim, and desire to secure by Letters Patent, is—

An attachment for gas and oil stoves consisting of a metal hood or box having front and rear communicating sections and adapted to rest upon the top of the stove and cover the burners thereof, the front section having openings therein to support cooking utensils over the front burners, and the rear section of greater height than the front and divided into compartments in which the products of combustion from the front section may circulate, substantially as and for the purpose described.

In testimony whereof I have hereunto signed my name in the presence of two subscribing witnesses.

BERTHA EGER.

Witnesses:
   HERMANN H. B. MEYER,
   INGRID BUSCK-NIELSON.